(12) United States Patent
Tamai et al.

(10) Patent No.: US 7,701,667 B2
(45) Date of Patent: Apr. 20, 2010

(54) PERPENDICULAR MAGNETIC RECORDING MEDIUM AND MAGNETIC STORAGE APPARATUS USING THE SAME

(75) Inventors: Ichiro Tamai, Kanagawa (JP); Ikuko Takekuma, Kanagawa (JP); Hiroaki Nemoto, Kanagawa (JP); Yoshiyuki Hirayama, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 733 days.

(21) Appl. No.: 11/651,922

(22) Filed: Jan. 9, 2007

(65) Prior Publication Data

US 2007/0188924 A1      Aug. 16, 2007

(30) Foreign Application Priority Data

Jan. 10, 2006    (JP)    ............................. 2006-002836

(51) Int. Cl.
G11B 5/66    (2006.01)
(52) U.S. Cl. ........................ 360/135; 428/832; 428/827; 428/828
(58) Field of Classification Search ........................ None
See application file for complete search history.

(56) References Cited

U.S. PATENT DOCUMENTS

| | | | |
|---|---|---|---|
| 6,620,533 B2 | 9/2003 | Hikosaka et al. | |
| 6,753,102 B2 | 6/2004 | Murao et al. | |
| 7,604,879 B2* | 10/2009 | Gouke | ........................ 428/831 |
| 2003/0157375 A1 | 8/2003 | Uwazumi et al. | |
| 2004/0185308 A1 | 9/2004 | Koda et al. | |
| 2007/0020487 A1* | 1/2007 | Lim et al. | ................... 428/836 |
| 2008/0085426 A1* | 4/2008 | Kurita | ..................... 428/828.1 |
| 2008/0113221 A1* | 5/2008 | Hirayama et al. | ........... 428/810 |

FOREIGN PATENT DOCUMENTS

| | | |
|---|---|---|
| JP | 2001-222809 | 8/2001 |
| JP | 2003-178413 | 6/2003 |
| JP | 2004-022138 | 1/2004 |
| JP | 2004-220737 | 8/2004 |
| JP | 2004-259423 | 9/2004 |
| JP | 2004-310910 | 11/2004 |

* cited by examiner

*Primary Examiner*—Mark Blouin
(74) *Attorney, Agent, or Firm*—Townsend and Townsend and Crew LLP; Darren Gold (57) ABSTRACT

Embodiments in accordance with the present invention provide a perpendicular recording medium with low noise and high recording density by reducing the effects from noise generated from the vicinity of the interface with the intermediate layer of the recording layer, in a perpendicular recording medium utilizing a granular recording layer containing oxygen or oxide additive in a cobalt-chromium alloy formed on an intermediate layer with a ruthenium or ruthenium alloy layer. A first recording layer and a second recording layer are formed in order on an intermediate layer of ruthenium or ruthenium alloy. The first recording layer and the second recording layer are comprised of cobalt as the main material in a granular structure containing chromium and oxygen. The saturation magnetization of the first recording layer is lower than the saturation magnetization of the second recording layer. When a first recording layer saturation magnetization is set as Ms1(emu per cubic centimeter), a second recording layer saturation magnetization is set as Ms2(emu per cubic centimeter), and the first recording layer film thickness is set to t1 (nm), then (Ms2−Ms1)×t1 will be larger than 0 (memu per square centimeter) and smaller than 0.15 (memu per square centimeter).

12 Claims, 6 Drawing Sheets

PERPENDICULAR MAGNETIC RECORDING MEDIUM AND MAGNETIC STORAGE APPARATUS USING THE SAME

CROSS-REFERENCE TO RELATED APPLICATION

The instant nonprovisional patent application claims priority to Japanese Patent Application 2006-002836, filed Jan. 10, 2006 and incorporated by reference herein for all purposes.

BACKGROUND OF THE INVENTION

Embodiments in accordance with the present invention relate to a magnetic recording medium capable of recording vast amounts of information, and to a magnetic storage apparatus utilizing that magnetic recording medium.

In recent years, along with the great increase in information handled by computers, there are even greater demands to increase the storage capacity of hard disk devices utilized as auxiliary storage devices. More advances are also being made in mounting hard disk storage devices in electrical products used in the home, so demands are also increasing to make hard disk devices more compact and capable of handling a greater volume of information. Hard disk devices using the longitudinal magnetic recording method have attained a real magnetic recording density in excess of 20 gigabits per square centimeter. However attaining an even greater recording density with this method is becoming difficult. Perpendicular magnetic recording is under evaluation as a substitute for the above method. In perpendicular magnetic recording the high density recording region is less susceptible to effects from demagnetizing fields than in longitudinal magnetic recording. Therefore, the perpendicular magnetic recording method is better for high density information storage.

A recording layer made from an alloy of cobalt, chromium, and platinum (CoCrPt) utilized in the longitudinal recording medium of the background art was evaluated for perpendicular magnetic recording media used for this perpendicular magnetic recording method. However, a granular type recording layer with oxygen or oxides added to the CoCrPt alloy was proposed in order to reduce noise even further and this granular recording layer has been the focus of much attention. When this granular recording layer was in the recording layer made from CoCrPt alloy of the background art, the noise was reduced by magnetically isolating the magnetic grains, by segregating the non-magnetic material into grain boundaries mainly of chromium by utilizing the cobalt and chromium phase separation. Chromium was added in large amounts to increase the noise reduction effect but in that case much chromium remained within the magnetic grains, causing the problem that the magnetic anisotropy energy dropped, and the stability of the recording signal deteriorated. However, in the granular type recording layer, where oxygen or oxides were added to the CoCrPt alloy, the oxides can be easily separated from the magnetic grains so that if a template can be formed as the under layer for forming the oxide grain boundary, then a structure where the oxides enclose the magnetic grains can be formed without adding large amounts of chromium. The chromium content within the magnetic grains would consequently be lowered so that noise could be reduced without a drop in the magnetic anisotropy energy.

Ruthenium is suitable as a material for the under layer of this granular type recording layer. This material was disclosed for example in JP 2001-222809 A, and in JP 2004-22138 A. Ruthenium grains possess a hexagonal closed packed structure identical to CoCrPt alloy so that the CoCrPt alloy can grow epitaxially on the ruthenium (Ru) layer and obtain a satisfactory c-axis orientation. Moreover, ruthenium can be made to grow as cylindrical-shaped grains with clear (easy to see) surface protrusions corresponding to the grains, so that the surface protrusions on these ruthenium grains serve as a template for forming an oxide grain boundary on the granular recording layer. Ruthenium material containing additives such as oxides are also ideal as a under layer for the granular recording layer as disclosed for example in JP 2004-220737 A. Non-magnetic CoCr alloy and titanium (Ti) alloy also have the same hexagonal closed packed structure as CoCrPt alloy, and so are suitable as a under layer for obtaining the c-axis orientation for the CoCrPt alloy recording layer. However these alloys do not render a sufficient effect when forming the oxide grain boundary so they are not effective for reducing noise in the granular recording layer. Further, the CoCrPt alloy recording layer yields a satisfactory c-axis orientation even if using a material with a face-centered cubic structure such as platinum (Pt), palladium (Pd) or nickel (Ni) alloy, however it is still inadequate for forming the oxide grain boundary and so are unsuitable as a under layer for the granular recording layer.

On the other hand, intensive research efforts are being made on lowering noise by improving the granular recording layer. One example is laminating recording layers made up of two or more different layers as for example disclosed in JP 2004-310910 A and in JP 2004-259423 A.

BRIEF SUMMARY OF THE INVENTION

Embodiments in accordance with the present invention provide a perpendicular recording medium with low noise and high recording density by reducing the effects from noise generated from the vicinity of the interface with the intermediate layer of the recording layer, in a perpendicular recording medium utilizing a granular recording layer containing oxygen or oxide additive in a cobalt-chromium alloy formed on an intermediate layer with a ruthenium or ruthenium alloy layer. Referring to the particular embodiment of FIG. 1, a first recording layer 15 and a second recording layer 16 are formed in order on an intermediate layer of ruthenium or ruthenium alloy. The first recording layer and the second recording layer are comprised of cobalt as the main material in a granular structure containing chromium and oxygen. The saturation magnetization of the first recording layer is lower than the saturation magnetization of the second recording layer. When a first recording layer saturation magnetization is set as $Ms1$ (emu per cubic centimeter), a second recording layer saturation magnetization is set as $Ms2$ (emu per cubic centimeter), and the first recording layer film thickness is set to $t1$ (nm), then $(Ms2-Ms1) \times t1$ will be larger than 0 (memu per square centimeter) and smaller than 0.15 (memu per square centimeter).

For a more complete understanding of the present invention, reference is made to the following detailed description taken in conjunction with the accompanying drawings.

DETAILED DESCRIPTION OF THE INVENTION

Ruthenium or ruthenium (Ru) alloy is suitable as an under layer (hereafter this layer is called the intermediate layer to distinguish it from the soft magnetic under layer) for granular recording layer containing oxygen or oxides in the cobalt-chromium (CoCr) alloy. However in this case, there is a large mismatch between the Ru and CoCr alloy crystalline matrices so that matrix deformation occurs in the vicinity of the interface with the intermediate layer of the recording layer. Results from a detailed study of the recording layer magnetic properties revealed that the magnetic anisotropy had dropped in a section less than five nanometers thick near the boundary with the intermediate layer. Investigating this section in detail further showed that though the magnetic anisotropy had drastically decreased, the magnetization had not decreased so this section was the cause of the noise. The saturation magnetization was especially high so that noise was noticeable when CoCr alloy possessing large magnetic anisotropic energy was utilized in the recording layer.

One object of an embodiment of the present invention is to provide a perpendicular magnetic recording medium capable of recording at high density and with low noise by reducing the effect of noise generated from the vicinity of the interface with the intermediate layer of the recording layer, in a perpendicular magnetic recording medium utilizing an intermediate layer of ruthenium (Ru) or Ru alloy, and a granular recording layer containing additives of oxygen or oxides in a cobalt-chromium (CoCr) alloy formed on that intermediate layer.

Another object of an embodiment of the present invention is to provide a magnetic storage apparatus for fully utilizing the performance of that perpendicular magnetic recording medium.

In order to achieve one or more the above stated objects, the perpendicular magnetic recording medium of embodiments of the present invention is characterized by a granular structure comprising: a soft magnetic layer, an intermediate layer made from ruthenium or ruthenium alloy, a first recording layer, a second recording layer, and a protective layer all formed sequentially in laminations on a substrate, and the main constituent of the first recording layer and the second recording layer is cobalt, along with chromium and oxygen; and when the saturation magnetization of the first recording layer is set lower than the saturation magnetization of the second recording layer, with first recording layer saturation magnetization at Ms1 (emu per cubic centimeter), and the second recording layer saturation magnetization at Ms2 (emu per cubic centimeter), and the film thickness of the first recording layer set to t1 (nm); then (Ms2−Ms1)×t1 will be larger than 0 (memu per square centimeter), and smaller than approximately 0.15 (memu per square centimeter).

Reducing the mismatch in the space between the crystal matrices of the intermediate layer of the Ru or Ru alloy and the CoCr alloy recording layer is considered an effective countermeasure for suppressing the effects of noise generated near the boundary with the intermediate layer of the recording layer. Ruthenium (Ru) or Ru alloy is suitable as the intermediate layer for forming an oxide grain boundary in the granular recording layer to obtain low noise properties but the resulting change in intermediate layer material makes it impossible to reduce the mismatch in the space between the crystal matrices. The present inventors took note of the fact that noise from the medium can be reduced by forming an extremely thin layer with low saturation magnetization in the vicinity of the interface with the intermediate layer of the recording layer and proceeded to develop this concept into this invention. The ruthenium (Ru) alloy intermediate layer in this invention is an alloy containing approximately 50 at % or more of ruthenium.

Selecting the chromium content contained in the first recording layer and the second recording layer is necessary in order to obtain the saturation magnetization described above in the first recording layer and the second recording layer. In other words, when the chromium content versus the total amount of cobalt (Co), chromium (Cr), and platinum (Pt) (when containing Pt) contained in the first recording layer is set as C1 (at %); and the chromium content versus the total amount of Co, Cr, and Pt (when containing Pt) contained in the second recording layer is set as C2 (at %); and the first recording layer film thickness is set to t1 (nm) then C1 is necessary to be larger than C2, and (C1−C2)×t1 is necessary to be made larger than 0 (at %·run) and smaller than approximately 75 (at %·nm).

In the perpendicular magnetic recording medium according to an embodiment of the present invention, there is a large improvement in the signal to noise (S/N) of the medium when the film thickness of the first recording layer is larger than 0 nm and smaller than 5 nm, and when the differential (C1−C2) between the chromium content C1 (at %) versus the total amount of Co, Cr and Pt (when containing platinum) contained in the first recording layer; and the chromium content C2 (at %) versus the total amount of Co, Cr and Pt (when containing platinum) contained in the second recording layer is larger than 14 at %. Moreover, the improvement in the signal to noise (S/N) of the medium is large when the chromium content versus the total amount of Co, Cr and Pt contained in the second recording layer is smaller than approximately 12 at %. The improvement in the signal to noise (S/N) of the medium is also large when the first recording layer contains no Pt, or if it contains Pt, the Pt content versus the total amount of Co, Cr and Pt is smaller than approximately 15 at %.

The perpendicular magnetic recording medium in accordance with an embodiment of the present invention possesses good overwrite characteristics when a third recording layer containing cobalt (Co) as the main material but not containing oxide is formed on the second recording layer.

A magnetic storage apparatus with a recording density of approximately 25 gigabits per square centimeter can be attained by utilizing the perpendicular magnetic recording medium in accordance with an embodiment of the present invention.

Embodiments in accordance with the present invention can provide a high reliability perpendicular magnetic recording medium capable of high density recording and durable enough to withstand use over long periods since the signal-to-noise (S/N) ratio of the perpendicular magnetic recording medium is improved. A compact and large capacity magnetic storage device can be provided by utilizing this type of perpendicular magnetic recording medium.

Experimental examples of embodiments of the present invention are described next while referring to the drawings.

FIRST EXPERIMENTAL EXAMPLE

Figure 1:
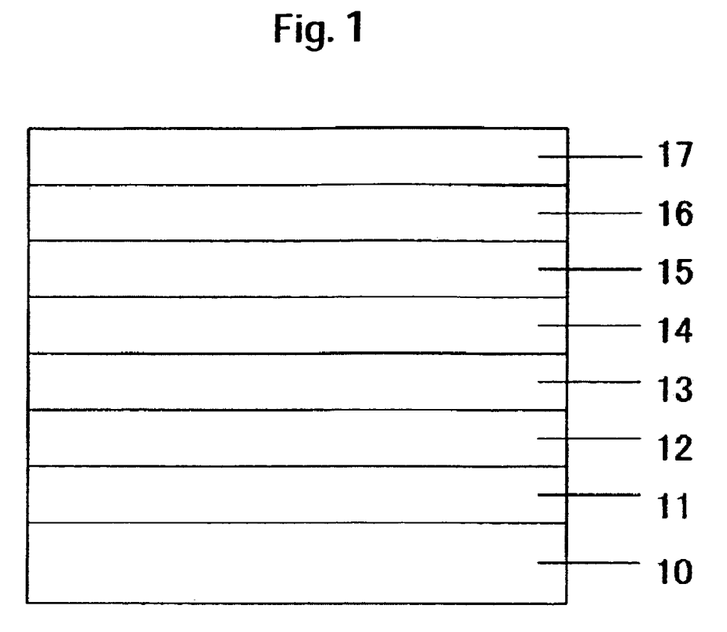
FIG. 1 is a cross sectional diagrammatic view of the layered structure of the perpendicular magnetic recording medium in accordance with an embodiment of the present invention.

FIG. 1 is a drawing showing a cross sectional diagram of the perpendicular magnetic recording medium in accordance with an embodiment of the present invention. The perpendicular magnetic recording media for these experiments were fabricated utilizing an ANELVA sputtering device (C-3010). This sputtering device is comprised of 10 process chambers and 1 substrate loading chamber. Each chamber was separately exhausted (evacuated). After exhausting all the chambers to a vacuum intensity within $2\times10^{-5}$ Pa, a carrier loaded with the substrate was shifted in sequence to each process chamber and the following processes were performed.

A precoat layer 11, a soft magnetic layer 12, a seed layer 13, an intermediate layer 14, a first recording layer 15, a second recording layer 16, and a protective layer 17 were all deposited in sequence by the DC magnetron sputtering method onto a substrate 10. A glass disk with approximately 65 millimeters in diameter and approximately 0.635 millimeters thick was utilized as the substrate 10. A nickel (Ni) alloy film with a tantalum (Ta) content of approximately 37.5 at % deposited in a thickness of approximately 30 nanometers as the precoat layer 11, and a two-layer film comprised of a cobalt (Co) alloy film with a tantalum (Ta) content of approximately 3 at % and zirconium (Zr) approximately 5 at % deposited to a thickness of approximately 50 nanometers via a ruthenium (Ru) film of approximately 0.6 nanometers as the soft magnetic layer 12, and a nickel (Ni) film with a tungsten (W) content of approximately 7 at % was deposited to a thickness of approximately 3 nanometers as the seed layer 13 were formed under conditions of an argon gas pressure of approximately 0.7 Pa on the unheated substrate. After forming a ruthenium film approximately six nanometers thick under conditions of an argon gas atmosphere of approximately 1 Pa, a ruthenium film with a thickness of approximately 6 nanometers was formed above it under conditions of an argon gas pressure of approximately 5 Pa, to together form the intermediate layer 14. A first recording layer 15 and a second recording layer 16 were formed under conditions of a gas pressure of approximately 4 Pa utilizing the mixed gas of argon and approximately 0.5 percent oxygen, and changing the respective film thicknesses so that the total film thickness of the recording layer became approximately 14 nanometers. Finally, a carbon film approximately 5 nanometers thick was formed as the protective layer 17 under conditions of a gas pressure of approximately 0.6 Pa utilizing the mixed gas of argon and approximately 8 percent nitrogen.

Media of different types were fabricated utilizing the composition of the first recording layer, and the film thickness ratios of the first recording layer and the second recording layer as parameters, and their read/write characteristics were investigated. The medium was fabricated as follows (values are approximate): Co-17 at % Cr-14 at % Pt alloy, Co-22 at % Cr-8 at % Pt alloy, Co-10 at % Cr-14 at % Pt alloy, Co-26 at % Cr-8 at % Pt alloy, Co-31 at % Cr-10 at % Pt alloy, Co-33 at % Cr-4 at % Pt alloy, and Co-40 at % Cr alloy sputtering targets respectively added with 8 mol % of $SiO_2$ were used to form the first recording layer. A Co-17 at % Cr-14 at % Pt alloy sputtering target added with 8 mol % of $SiO_2$ was used to form the second recording layer.

In order to measure the saturation magnetization (Ms) of the recording layer fabricated using the different sputter targets described above, evaluation samples made from only one kind of recording layer with no soft magnetic layer were separately formed and cut into approximately eight millimeter squares, and a vibrating sample magnetometer utilized. The saturation magnetization was obtained by measuring the magnetization curve with applying a maximum magnetic field of approximately 1035 kA/m perpendicular to the sample film surface.

A spin stand was utilized to evaluate the read/write characteristics. This evaluation utilized a magnetic head including a single magnetic pole type write element with a track width of approximately 95 nanometers, and a read sensor (element) with a track width of approximately 70 nanometers using the giant magnetoresistive effect. The write output and the noise were measured under conditions of a circumferential velocity of approximately 10 meters per second, a skew angle of approximately 0 degrees, and a magnetic spacing of approximately 15 nanometers. The signal-to-noise ratio (S/N) of the medium was set as the ratio of the read output with a signal of approximately 1970 fr/mm and the integral noise when a signal of approximately 31520 fr/mm was recorded.

The composition of each layer in the medium was found using X-ray photoelectron spectroscopy. Sputtering was performed from the sample surface with an ion gun at an acceleration voltage of approximately 500 volts and progressing in the depth direction, using aluminum K rays as the X-ray source, a section with a length of approximately 1.5 millimeters and width of approximately 0.1 millimeters was analyzed. The content of each element was found by detecting the spectrum in the vicinity of the energy corresponding respectively to the carbon 1s electron, the oxygen 1s electron, the silicon 2s electron, the chromium 2p electron, the cobalt 2p electron, the ruthenium (Ru) 3d electron, and the platinum (Pt) 4f electron. Hereafter, the expression "chromium (Cr) content of recording layer" does not indicate the chromium content versus all elements, but instead indicates a value found for the chromium (Cr) content at at % versus the total quantity of cobalt (Co), chromium (Cr) and platinum (Pt) contained in that recording layer. If that recording layer contains no platinum (Pt) then this expression indicates the chromium (Cr) content versus the total quantity of cobalt and chromium. The chromium content of the first recording layer is hereafter expressed as C1 (at %), and the chromium content of the second recording layer as C2 (at %).

Figure 2:
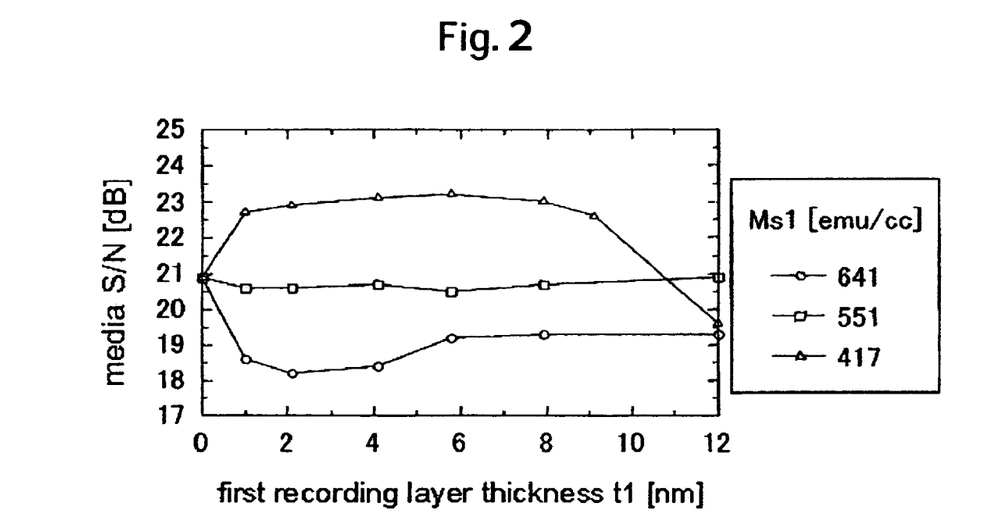
FIG. 2 is a graph showing the relation between the film thickness of the first recording layer and the medium S/N ratio in accordance with an embodiment of the present invention.

Results from evaluating the medium signal-to-noise (S/N) of samples for three typical groups in the medium are shown in FIG. 2. The three typical groups are the cases when the first recording layer is deposited by using (values are approximate): an alloy target (Co-17 at % Cr-14 at % Pt)-8 mol % $SiO_2$, an alloy target (Co-22 at % Cr-8 at % Pt)-8 mol % $SiO_2$, and an alloy target (Co-10 at % Cr-14 at % Pt)-8 mol % $SiO_2$. The saturation magnetization for the films that were formed was respectively approximately 551 emu per cubic centimeter, approximately 417 emu per cubic centimeter, and approximately 641 emu per cubic centimeter. The chromium content for the formed films was respectively approximately 13.6 at %, 21.4 at %, and 8.5 at %. The saturation magnetization and chromium content for the second recording layer were respectively approximately 551 emu per cubic centimeter, and approximately 13.6 at %. The film thickness (hereafter shown as t1) of the first recording layer is expressed along the horizontal axis. As clearly shown in FIG. 2, there is a range for t1 where the medium signal-to-noise (S/N) ratio drastically improves when the first recording layer is formed with an alloy target (values are approximate) (Co-22 at % Cr-8 at % Pt)-8 mol % $SiO_2$, namely when the saturation magnetization of the first recording layer (hereafter expressed as Ms1) was set lower than the saturation magnetization of the second recording layer (hereafter expressed as Ms2), or when the chromium content C1 of the first recording layer was set higher than the chromium content C2 of the second recording layer. When the first recording layer on the other hand, is formed from an alloy target (values are approximate) (Co-17 at % Cr-14 at % Pt)-8 mol % $SiO_2$, or namely the Ms1 and Ms2 are the same, or when C1 and C2 are the same, as well as when the first recording layer is formed from an alloy target (values are approximate) (Co-10 at % Cr-14 at % Pt)-8 mol % $SiO_2$, or namely Ms1 was higher than Ms2, or C1 was lower than C2, then there was no increase in the signal-to-noise (S/N) ratio even if the S/N ratio decreased.

Figure 3:
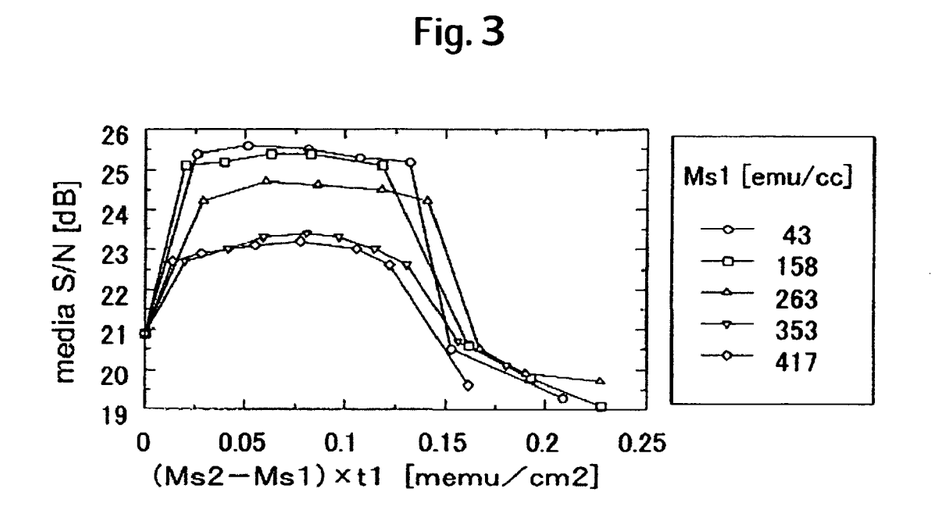
FIG. 3 is a graph showing the relation of (Ms2−Ms1)×t1 to the medium S/N ratio.

Results from plotting the medium S/N ratio for (Ms2−Ms1)×t1 along the horizontal axis are shown in FIG. 3 for the first recording layer utilizing an alloy target (values are approximate) (Co-22 at % Cr-8 at % Pt)-8 mol % $SiO_2$, an alloy target (Co-26 at % Cr-8 at % Pt)-8 mol % $SiO_2$, an alloy target (Co-31 at % Cr-10 at % Pt)-8 mol % $SiO_2$, an alloy target (Co-33 at % Cr-4 at % Pt)-8 mol % $SiO_2$, and an alloy target (Co-40 at % Cr)-8 mol % $SiO_2$, in the above medium. The saturation magnetizations Ms1 were respectively approximately 417 emu per cubic centimeter, 353 emu per cubic centimeter, 263 emu per cubic centimeter, 158 emu per cubic centimeter and 43 emu per cubic centimeter. The chromium (Cr) concentrations C1 were respectively approximately 21.4 at %, 24.6 at %, 27.8 at %, 32.7 at %, and 38.7 at %. The Ms1 was smaller than Ms2, and C1 was larger than C2 in all of the samples. As FIG. 3 clearly shows for t1, Ms1 and Ms2, in those samples satisfying the relation 0<(Ms2−Ms1)×t1<0.15 (memu/cm2), an extremely high S/N ratio was obtained compared to media with the conventional structure.

Figure 4:
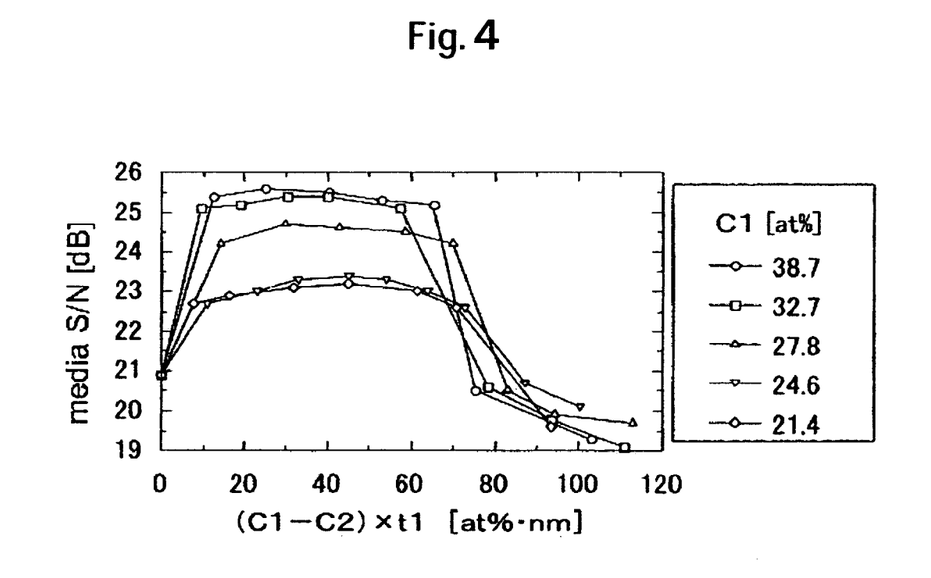
FIG. 4 is a graph showing the relation of (C1−C2)×t1 to the medium S/N ratio.

Results from plotting the medium S/N ratio for (C1−C2)×t1 along the horizontal axis are shown in FIG. 4 setting the chromium (Cr) content of the first recording layer and the second recording layer as the marker for the same medium. As can be clearly understood from FIG. 4, in those samples satisfying the relation 0<(C1−C2)×t1<75 (at %·nm), an extremely high S/N ratio was obtained compared to media with the conventional structure.

Figure 5:
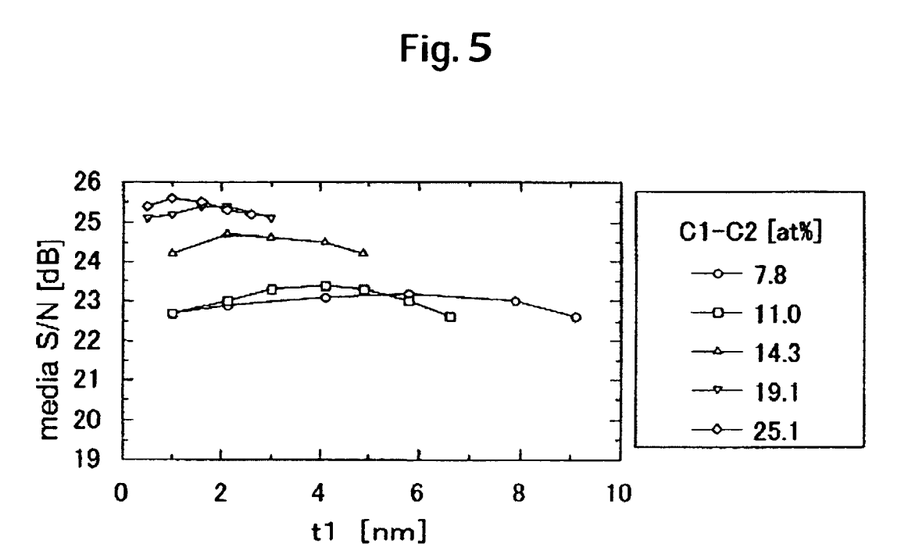
FIG. 5 is a graph showing the relation between the film thickness of the first recording layer and the medium S/N ratio.

Results plotted for the medium S/N ratio versus the film thickness t1 of the first recording layer along the horizontal axis are shown in FIG. 5 for medium samples showing a high SIN ratio satisfying the relation 0<(C1−C2)×t1<75 (a %·nm) among the samples in FIG. 4. The differential (C1−C2) in chromium content between the first recording layer and the second recording layer in the samples formed by using, for an alloy target (values are approximate) (Co-22 at % Cr-8 at % Pt)-8 mol % $SiO_2$, an alloy target (Co-26 at % Cr-8 at % Pt)-8 mol % $SiO_2$, an alloy target (Co-31 at % Cr-10 at % Pt)-8 mol % $SiO_2$, an alloy target (Co-33 at % Cr-4 at % Pt)-8 mol % $SiO_2$, and an alloy target (Co-40 at % Cr)-8 mol % $SiO_2$ serving as the first recording layer; were respectively approximately 7.8 at %, 11.0 at %, 14.3 at %, 19.1 at %, and 25.1%. These results indicate that making the thickness t1 of the first recording layer smaller than approximately 5 nanometers, and also making the chromium content differential (C1−C2) between the first recording layer and second recording layer larger than approximately 14 at % is effective for achieving a medium S/N ratio of approximately 24 dB or more.

The experimental example shows that forming a first recording layer with smaller saturation magnetization than a second recording layer on an intermediate layer of ruthenium or a ruthenium alloy is effective in lowering the effects of noise from sections where the magnetic anisotropy has dropped in the vicinity of the interface with the intermediate layer of ruthenium or a ruthenium alloy. However, the effect is obtained for the case of small film thickness t1 of the first magnetic layer if the differential in saturation magnetization (Ms2−Ms1) is large, and the effect is obtained even for the case of large film thickness t1 of the first magnetic layer as well as for the case of small t1 if the differential in saturation magnetization (Ms2−Ms1) is small. There is a clear boundary where the effect from these relations is obtained, and satisfying the relation 0<(Ms−M2)×t1<0.15 (memu/cm2) is important. When this relation is expressed with the chromium content, then 0<(C1−C2)×t1<75 (at %·nm) is obtained. Substituting just the section where the magnetic anisotropy has dropped in the vicinity of the interface intermediate layer of ruthenium or a ruthenium alloy, with a recording layer possessing small saturation magnetization is preferable for obtaining an even greater effect; and making t1 smaller than approximately 5 nanometers, and also making (C1−C2) larger than approximately 14 at % is also effective.

The effect of this invention is not limited by the type of substrate or the material for the precoat layer 11, soft magnetic layer 12, and seed layer 13, the forming process and thickness. For example, the same effect of the invention can be obtained when the precoat layer is not used, when FeCoB alloy was utilized as the soft magnetic layer, or NiTa alloy was utilized as the seed layer.

The intermediate layer making contact with the first recording layer is not limited to ruthenium (Ru) and the same effect may be obtained for example from utilizing a ruthenium alloy such as (values are approximate) Ru-7 mol % $SiO_2$, Ru-15 at % Co, Ru-10 at % Ti, Ru-5% Cr. However, if using a non-magnetic CoCr alloy or Ti alloy as the intermediate layer making contact with the first recording layer, one must note that their hexagonal closed packed structure is identical to the CoCrPt alloy so that even though a good c-axial orientation is obtained for the CoCrPt alloy recording layer, forming an oxide grain boundary for the recording layer does not yield a sufficient effect so that the medium S/N ratio is extremely low and the effect of the invention cannot be obtained. Moreover, even if a material with a face centered cubic structure such as Pt, Pd, Ni alloy is utilized, a good c-axial orientation can be obtained for the CoCrPt alloy recording layer, however forming the oxide grain boundary will still be inadequate so that the medium S/N ratio is extremely low and the effect of the invention cannot be obtained. The effect of this invention is obtained by utilizing ruthenium or ruthenium alloy as the intermediate layer making contact with the first recording layer. Using any other material as the intermediate layer making contact with the first recording layer will cause problems in forming the oxide grain boundary, and the effect of this invention may not be obtained.

The same effect can be obtained when forming the first recording layer and the second recording layer, even if the content of the oxide mixed into the target for use is changed, or even if oxides are formed in the grain boundary of the recording layer just by supplying oxygen gas during the process without mixing oxides into the target. The same effect can also be obtained even if another oxide is substituted for the silicon oxide such as when substituted with Ta oxide or Ti oxide. In terms of the recording layer film thickness, the noise in the vicinity of the interface with the intermediate layer can be remarkably reduced when the total film thickness of the first recording layer and second recording layer is made approximately 20 nanometers or less. When the first recording layer is a film that does not contain oxides, such as when utilizing a (values are approximate) Co-22 at % Cr-8 at % Pt alloy target, a Co-26 at % Cr-8 at % Pt alloy target, a Co-31 at % Cr-10 at % Pt alloy target, a Co-33 at % Cr-4 at % Pt alloy target, and a Co-40 at % Cr alloy target, then these will not serve as a template for forming the oxide grain boundary for the second recording layer so that the S/N ratio of the medium will be low, and the effect of this invention will not be obtained. The effect of this invention is obtained by using cobalt (Co) as the main material of the first recording layer and the second recording layer and also using film with a granular structure containing chromium and oxygen.

SECOND EXPERIMENTAL EXAMPLE

The medium is the same structure as the first experimental example, however a medium with a different first recording layer composition, and different second recording layer composition were fabricated and their read/write characteristics were investigated. The S/N ratios of the media were compared using the chromium content of thee second recording layer and the film thickness of the first recording layer as parameters. The media were fabricated using a (values are approximate) Co-33 at % Cr-4 at % Pt alloy sputter target added with $SiO_2$ at 8 mol % for the first recording layer; and a Co-6 at % Cr-14 at % Pt alloy, a Co-10 at % Cr-14 at % Pt alloy, a Co-14 at % Cr-14 at % Pt alloy, a Co-17 at % Cr-14 at % Pt alloy, a Co-19 at % Cr-14 at % Pt alloy, and a Co-22 at % Cr-14 at % Pt alloy sputter target added with $SiO_2$ at 8 mol % for the second recording layer. The saturation magnetization Ms1 and the chromium content C1 for the first recording layer were respectively approximately 158 emu per cubic centimeter and approximately 32.7 at %. The saturation magnetization Ms1 for the second recording was in order, respectively, approximately 725 emu per cubic centimeter, 641 emu per cubic centimeter, 597 emu per cubic centimeter, 551 emu per cubic centimeter, 516 emu per cubic centimeter, and 466 emu per cubic centimeter. The chromium content C2 was respectively approximately 4.7 at %, 8.5 at %, 11.2 at %, 13.6 at %, 15.2 at %, and 17.7 at %.

Figure 6:
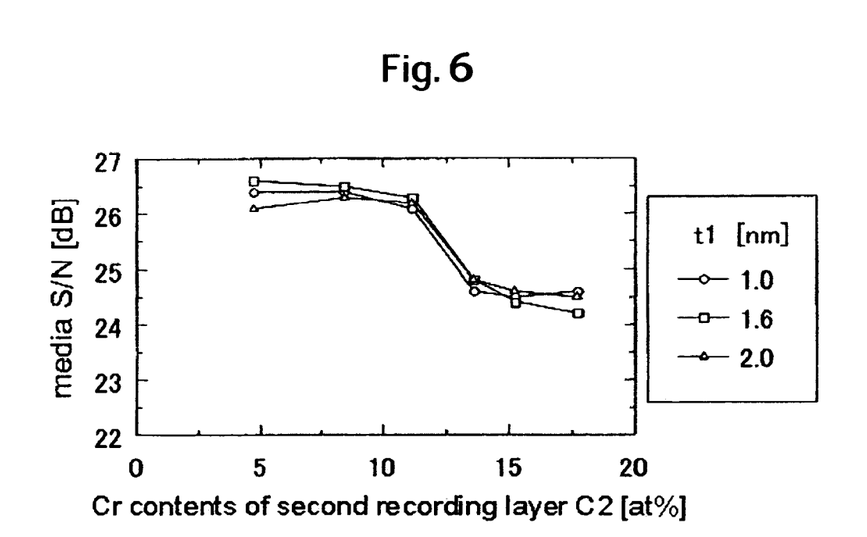
FIG. 6 is a graph showing the relation between the medium S/N ratio and the C2.

FIG. 6 shows results from plotting the medium S/N ratio per the second recording layer chromium content C2 on the horizontal axis for the three cases where the film thicknesses of the first recording layer are approximately 1 nanometer, 1.6 nanometer, and 2.1 nanometer. A higher medium S/N ratio was obtained when C2 was smaller than approximately 12 percent. Though a granular recording layer made from oxides and CoCrPt alloy possessing a small chromium content and a large saturation magnetization has the potential to obtain a medium with a high medium S/N ratio, a large amount of noise is generated from the vicinity of the interface with the intermediate layer of ruthenium or ruthenium alloy so that the related art was unable to show a high S/N ratio in the medium. However, one can surmise that utilizing this invention renders the effect of a higher medium S/N ratio since the noise generated from the vicinity of the interface with the intermediate layer of ruthenium or ruthenium alloy is suppressed.

If within the scope of the effect rendered by this invention, the effect of a large improvement in the medium S/N ratio is not dependent on the composition of the CoCrPt alloy in the first recording layer, and can also be obtained without depending on the Pt content of the second recording layer. The effect is more remarkable when the total film thickness of the first recording layer and the second recording layer is approximately 15 nanometers or less.

THIRD EXPERIMENTAL EXAMPLE

Figure 7:
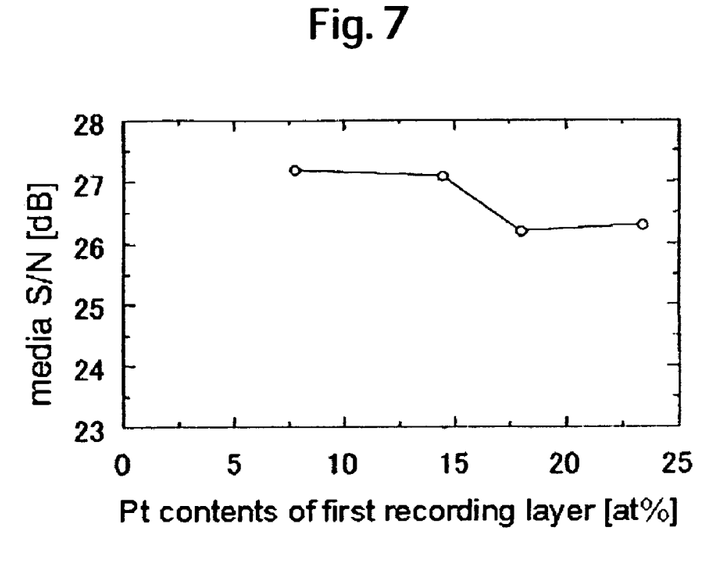
FIG. 7 is a graph showing the relation between the platinum content of the first recording layer and the medium S/N ratio.

The medium is the same structure as the first experimental example, however a medium with a different first recording layer composition, and a different second recording layer composition were fabricated and their read/write characteristics were investigated. The total film thickness of the first recording layer and the second recording layer was set to approximately 11 nanometers. The medium S/N ratios were then compared using the Pt content of the first recording layer as the parameter. The medium was fabricated utilizing sputtering targets of (values are approximate) Co-31 at % Cr-14 at % Pt alloy, a Co-31 at % Cr-10 at % Pt alloy, a Co-31 at % Cr-8 at % Pt alloy, and a Co-31 at % Cr-4 at % Pt alloy for the first recording layer, and a Co-10 at % Cr-14 at % Pt alloy target for the second recording layer and each added with $SiO_2$ at 9 mol %. The platinum (Pt) content of the first recording layer was respectively approximately 23.4 at %, 18.0 at %, 14.4 at %, and 7.8 at %. The Pt content described here is the platinum content versus the total amount of cobalt, chromium, and platinum contained in the first recording layer. Results from evaluating the medium S/N ratio of these samples are shown in FIG. 7. A higher medium S/N ratio was obtained when the platinum (Pt) content of the first recording layer was smaller than approximately 15 at %.

Adding a platinum element to the CoCr alloy has the effect of increasing the magnetic anisotropy. However, adding platinum in large quantities causes a drop in the magnetic anisotropy due to large amount of stacking faults. Utilizing a granular recording layer whose core is a CoCrPt alloy with good crystallization and few stacking faults in the first recording layer is effective in obtaining the full effect of the invention.

FOURTH EXPERIMENTAL EXAMPLE

Figure 8:
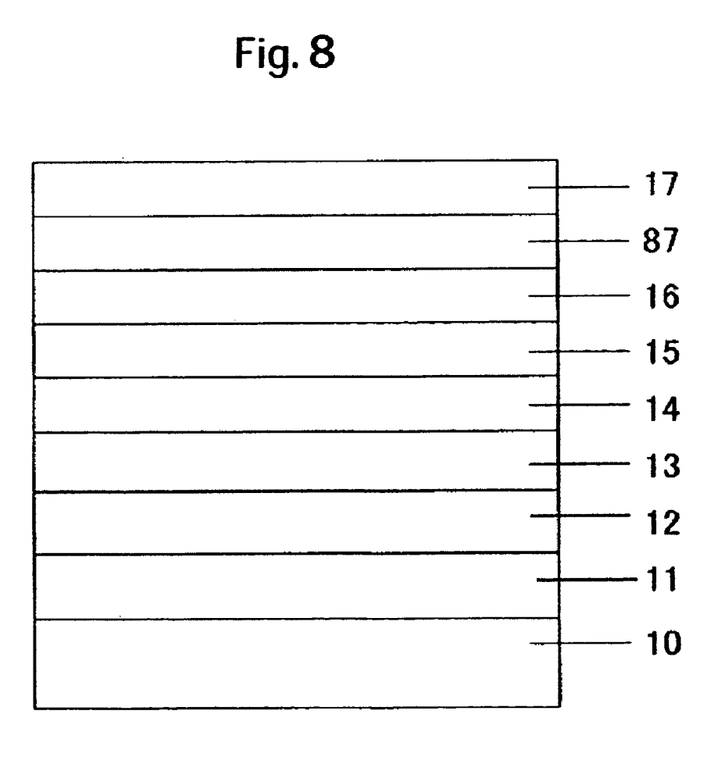
FIG. 8 is a cross sectional diagrammatic view of the layered structure of the perpendicular magnetic recording medium in accordance with an embodiment of the present invention.

The medium structure of the fourth experimental example is the same as the first experimental example; however, the medium was fabricated containing a third recording layer between the second recording layer and the protective layer. The structure and the fabrication conditions for media other than the third recording layer were the same as the first experimental example. FIG. 8 is a drawing showing a cross sectional diagrammatic view of a model of the perpendicular magnetic recording medium for this experiment. A first recording layer 15 was formed using a target of (values are approximate) (Co-33 at % Cr-4 at % Pt)-8 mol % $SiO_2$ alloy, and a second recording layer 16 was formed using a target of (values are approximate) (Co-10 at % Cr-14 at % Pt) -8 mol % $SiO_2$ alloy, and a third recording layer 87 was formed using targets of (values are approximate) Co-21 at % Cr-10 at % Pt alloy, Co-25 at % Cr-8 at % Pt alloy, or Co-29 at % Cr-6 at % Pt alloy. The third recording layer 87 was formed from film not containing oxygen and no oxygen was supplied during the sputtering. The third recording layer 87 was formed under conditions of an argon gas pressure of approximately 1 Pa, and the film thickness was set to approximately 6 nanometers.

The overwrite characteristics of the above medium were compared for the case where the third recording layer was formed using targets of (values are approximate) Co-21 at % Cr-10 at % Pt alloy, Co-25 at % Cr-8 at % Pt alloy, or Co-29 at % Cr-6 at % Pt alloy, and the case where there was no third recording layer. Results from this comparison showed that the overwrite characteristics were respectively improved by approximately 18.3dB, 15.2 dB, and 12.8 dB. The medium S/N ratios were the same values as when no third recording layer was used.

By forming a third recording layer with cobalt as the main content and not containing oxides, on the second recording layer of the medium of this invention with a structure shown in FIG. 1, a medium can be obtained possessing a high S/N ratio as well as a excellent overwrite characteristics.

FIFTH EXPERIMENTAL EXAMPLE

Figure 9A:
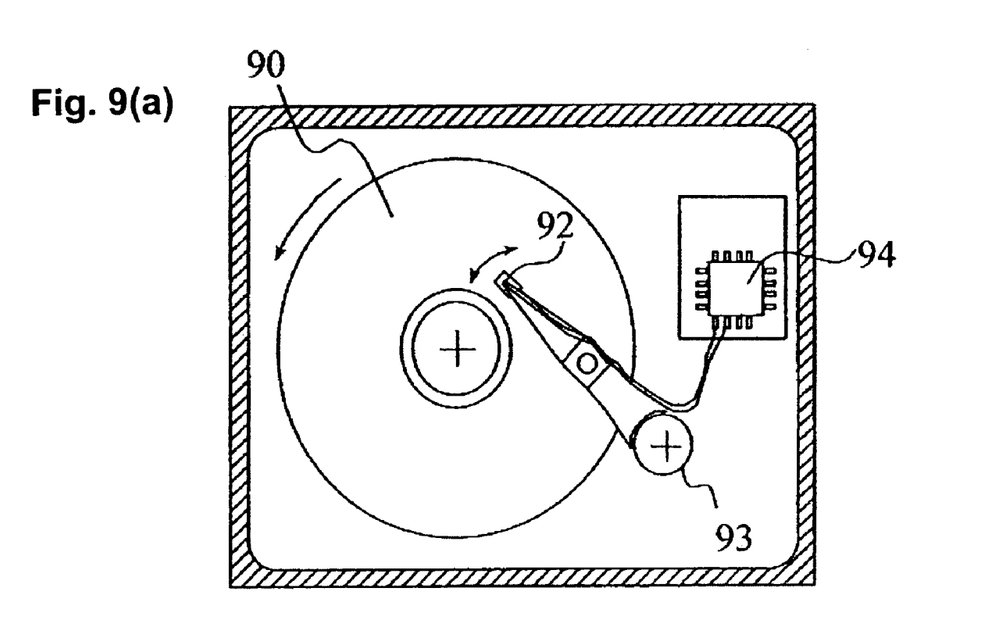
FIGS. 9(a)-(b) are concept views of the magnetic storage apparatus in accordance with an embodiment of the present invention.
Figure 9B:
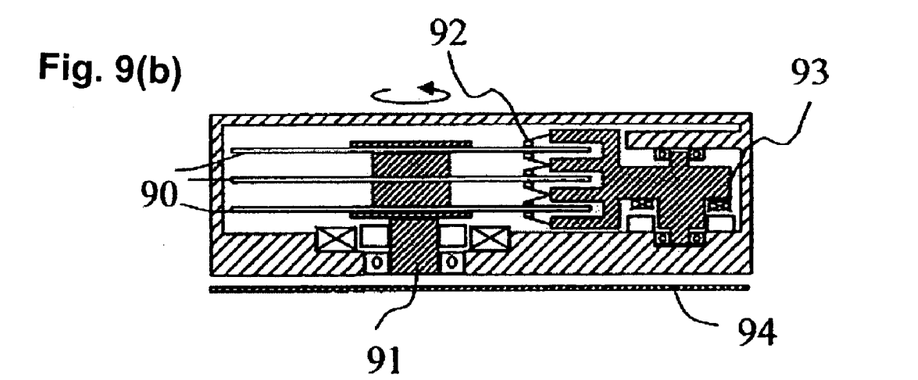

FIGS. 9(a)-(b) are concept drawings of the magnetic storage apparatus of an embodiment of this invention. FIG. 9(a) is a plan view and FIG. 9B is a cross sectional view. The magnetic storage apparatus includes a magnetic recording medium 90 formed from (values are approximate) Co-31 at % Cr-4 at % Pt alloy added with $SiO_2$ at 9 mol % for forming the first recording layer in the above third experimental sample, a magnetic recording medium driver 91 to drive the magnetic recording medium, a magnetic head 92 containing a reading unit and recording unit, a magnetic head driver 93 to drive the magnetic head relative to the magnetic recording medium, and a signal processing unit means 94 to input and output signals to the magnetic head. The reading unit of the magnetic head 92 possesses a magnetoresistance effect, and the recording unit is a single magnetic pole type head including a main pole and an auxiliary pole. The flying height of the magnetic head was set to approximately 15 nanometers. Operation at approximately 27.9 gigabits per square centimeter was confirmed by utilizing this device structure where the linear density was set to approximately 354,600 bits per one centimeter, and the track density was approximately 78,740 tracks per one centimeter.

Figure 10:
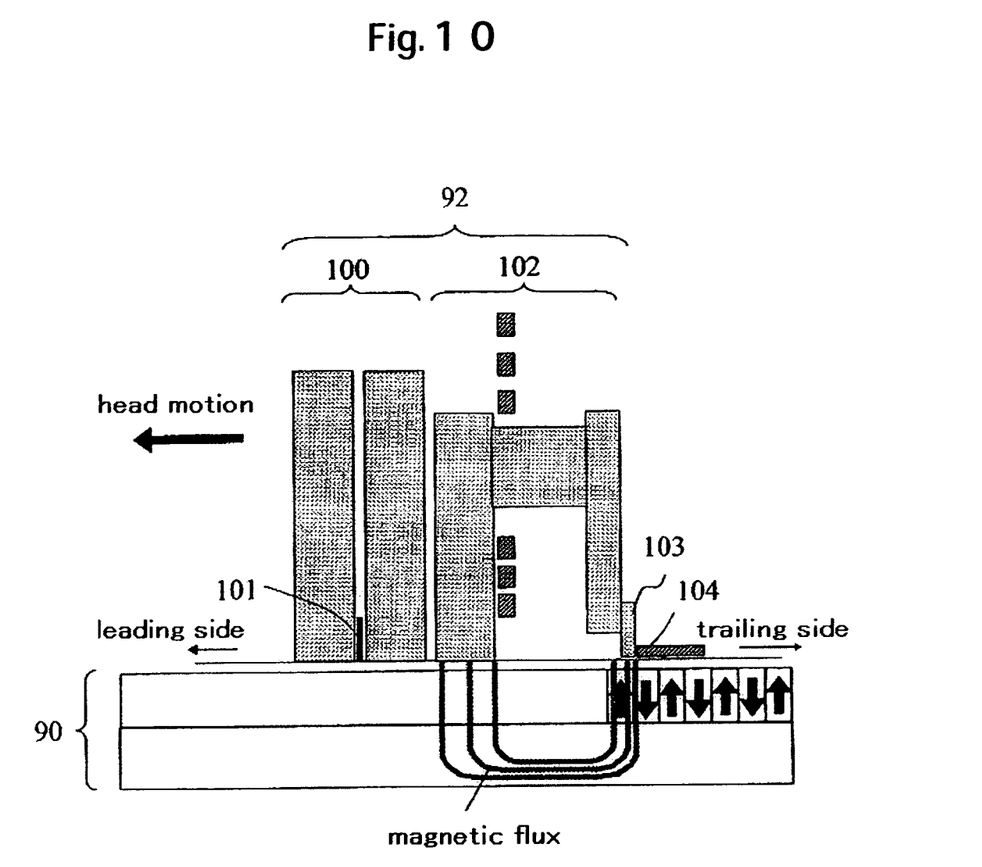
FIG. 10 is a concept view showing the relation between the magnetic recording medium and the magnetic head in accordance with an embodiment of the present invention.

The medium of the fourth experimental sample for the magnetic recording medium 90 for the magnetic storage apparatus shown in the concept drawing in FIG. 9 is assembled with (values are approximate) a six nanometer Co-25 at % Cr-8 at % Pt alloy as the third recording layer. A single pole head enclosed by a shield forming around the main pole was utilized as the recording unit for the magnetic head 92. FIG. 10 is a diagrammatic cross section showing the relation between the magnetic head 92 and the magnetic recording medium 90. The magnetic head 92 includes a reading unit 100 containing a giant magnetoresistive sensor (GMR) 101 enclosed by a pair of magnetic shields 106, 107, and a recording unit 102 comprised of a single pole magnetic head including a main pole 103, an auxiliary pole 104, and a thin film coil 108. The main pole 103 contains a wrap around shield 105 on the periphery. The flying height of the magnetic head was set to approximately 15 nanometers. In this way, the magnetic recording field achieved a sharp gradient by utilizing a magnetic head formed with a shield around the main pole of the recording unit; a medium with a high S/N ratio was maintained and the overwrite characteristics improved by utilizing a magnetic recording medium formed to include a third recording layer, and operation of approximately 32.4 gigabits per square centimeter by a linear density of approximately 374,100 bits per 1 centimeter and a track density of approximately 86,620 tracks per 1 centimeter was confirmed. A giant magnetoresistive (GMR) sensor was utilized in the read element however the same effect may also be achieved by using a tunneling magnetoresistive element (TMR, CPP).

What is claimed is:

1. A perpendicular magnetic recording medium comprising a soft magnetic layer, an intermediate layer made from ruthenium or ruthenium alloy, a first recording layer, a second recording layer, and a protective layer formed in sequence on a substrate, characterized in that the first recording layer and the second recording layer contain cobalt as the main material and possess a granular structure including chromium and oxygen, the saturation magnetization of the first recording layer is lower than the saturation magnetization of the second recording layer, and when the saturation magnetization of the first recording layer is set as Ms1(emu per cubic centimeter), and the saturation magnetization of the second recording layer is set as Ms2 (emu per cubic centimeter), and the first recording layer film thickness is set to t1(nm), then (Ms2−Ms1)×t1 will be larger than approximately 0 (memu per square centimeter) and smaller than approximately 0.15 (memu per square centimeter).

2. A perpendicular magnetic recording medium comprising: a soft magnetic layer, an intermediate layer made from ruthenium or ruthenium alloy, a first recording layer, a second recording layer, and a protective layer formed in sequence on a substrate, characterized in that the first recording layer and the second recording layer contain cobalt as the main material and possess a granular structure including chromium and oxygen, and when the chromium content versus the total amount of cobalt, chromium, and platinum contained in the first recording layer is set as C1 (at %), and the chromium content versus the total amount of cobalt, chromium, and platinum contained in the second recording layer is set as C2 (at %), and the thickness of the first recording layer film is set as t1 (nm), then C1 is larger than C2, and (C1−C2)×t1 is larger than approximately 0 (at %·nm) and smaller than approximately 75 (at %·nm).

3. The perpendicular magnetic recording medium according to claim 2, characterized in that the film thickness t1 (nanometers) of the first recording layer is larger than approximately 0 nanometers and smaller than approximately 5 nanometers, and that the chromium content differential (C1−C2) between the chromium content C1 (at %) versus the total amount of cobalt, chromium and platinum contained in the first recording layer and the chromium content C2 (at %) versus the total amount of cobalt, chromium and platinum contained in the second recording layer is larger than approximately 14 at %.

4. The perpendicular magnetic recording medium according to claim 2, characterized in that the chromium content versus the total amount of cobalt, chromium and platinum contained in the second recording layer is smaller than approximately 12 at %.

5. The perpendicular magnetic recording medium according to claim 3, characterized in that the chromium content versus the total amount of cobalt, chromium and platinum contained in the second recording layer is smaller than approximately 12 at %.

6. The perpendicular magnetic recording medium according to claim 2, characterized in that the first recording layer does not contain platinum, or if the first recording layer does contain platinum then the platinum content versus the total amount of cobalt, chromium and platinum contained in the first recording layer is smaller than approximately 15 at %.

7. The perpendicular magnetic recording medium according to claim 3, characterized in that the first recording layer does not contain platinum, or if the first recording layer does contain platinum then the platinum content versus the total amount of cobalt, chromium and platinum contained in the first recording layer is smaller than approximately 15 at %.

8. The perpendicular magnetic recording medium according to claim 1, characterized in that a third recording layer comprising cobalt as the main material and not containing oxides is laminated onto the second recording layer.

9. The perpendicular magnetic recording medium according to claim 2, characterized in that a third recording layer comprising cobalt as the main material and not containing oxides is laminated onto the second recording layer.

10. A magnetic storage apparatus comprising: a perpendicular magnetic recording medium, a means for driving the perpendicular magnetic recording medium in the recording direction, a magnetic head including a recording unit and a read element, a means to drive the magnetic head relative to the perpendicular magnetic recording medium, and a signal processing unit to process input signals and output signals to and from the magnetic head, characterized in that the perpendicular magnetic recording medium has a soft magnetic layer, an intermediate layer made from ruthenium or ruthenium alloy, a first recording layer, a second recording layer, and a protective layer formed in sequence in layers on a substrate, the first recording layer and the second recording layer contain cobalt as the main material and possess a granular structure including chromium and oxygen, and when the chromium content versus the total amount of cobalt, chromium, and platinum contained in the first recording layer is set as C1 (at %), and the chromium content versus the total amount of cobalt, chromium, and platinum contained in the second recording layer is set as C2 (at %) and the thickness of the first recording layer film is set as t1 (nm), then C1 is larger than C2, and (C1−C2)×t1 is larger than approximately 0 (at %·nm) and smaller than approximately 75 (at %·nm).

11. The magnetic storage apparatus according to claim 10, characterized in that the recording unit of the magnetic head is a single magnetic pole type including a main pole, an auxiliary pole, and a shield enclosing the periphery of the main pole.

12. The magnetic storage apparatus according to claim 10, characterized in that the perpendicular magnetic recording medium includes a third recording layer containing cobalt as the main material and not containing oxides that is laminated onto the second recording layer.

* * * * *